(12) United States Patent
McKelvey et al.

(10) Patent No.: US 10,406,874 B2
(45) Date of Patent: Sep. 10, 2019

(54) FIFTH WHEEL TRAILER LOCK

(71) Applicants: Roger D. McKelvey, Underwood, ND (US); Chad A. Smith, Underwood, ND (US)

(72) Inventors: Roger D. McKelvey, Underwood, ND (US); Chad A. Smith, Underwood, ND (US)

( * ) Notice: Subject to any disclaimer, the term of this patent is extended or adjusted under 35 U.S.C. 154(b) by 101 days.

(21) Appl. No.: 15/716,645

(22) Filed: Sep. 27, 2017

(65) Prior Publication Data

US 2019/0092110 A1 Mar. 28, 2019

(51) Int. Cl.
*B60D 1/60* (2006.01)
*B60D 1/01* (2006.01)

(52) U.S. Cl.
CPC .............. *B60D 1/60* (2013.01); *B60D 1/015* (2013.01)

(58) Field of Classification Search
CPC ...................................... B60D 1/60
See application file for complete search history.

(56) References Cited

U.S. PATENT DOCUMENTS

| | | | |
|---|---|---|---|
| 5,782,115 A | 7/1998 | Judy | |
| 6,092,825 A | 7/2000 | Flater | |
| 6,170,851 B1* | 1/2001 | Lindenman | B62D 53/0835 280/434 |
| 6,398,249 B1 | 6/2002 | Lindenman | |
| 6,434,982 B1* | 8/2002 | Rowland | B60R 25/001 70/14 |
| 6,598,432 B1* | 7/2003 | Dwyer | B60D 1/60 280/507 |
| 6,698,256 B2* | 3/2004 | Witchey | B60D 1/02 280/507 |
| 6,908,093 B1* | 6/2005 | Putnam | B62D 53/10 280/434 |
| 6,976,695 B1 | 12/2005 | Smith | |
| 7,300,068 B1 | 11/2007 | Johnsen | |
| 7,556,278 B2* | 7/2009 | Roberts | B62D 53/08 280/433 |
| 7,635,143 B2* | 12/2009 | Pappalardo | B60D 1/60 280/507 |
| 7,932,816 B2 | 4/2011 | Schmidt et al. | |
| 8,757,654 B2* | 6/2014 | Lachance | B60D 1/28 280/507 |
| 9,033,358 B1* | 5/2015 | Williamson | B60D 1/06 280/507 |
| 9,358,850 B1 | 6/2016 | Bale | |
| 2005/0179233 A1 | 8/2005 | Hogan | |
| 2013/0175787 A1* | 7/2013 | L'Heureux | B60D 1/60 280/507 |

* cited by examiner

*Primary Examiner* — Kevin Hurley
(74) *Attorney, Agent, or Firm* — Neustel Law Offices (57) ABSTRACT

A fifth wheel trailer lock for preventing a fifth wheel release handle from being operated to unlock a fifth wheel of a load hauler from a load supported by the fifth wheel. The fifth wheel trailer lock generally includes a handle mount that mounts on and releasably locks to a fifth wheel release handle in a predetermined orientation, a lock extension that extends outwardly from the handle mount into proximity with a stationary structure of the fifth wheel, and a fifth wheel catch on the lock extension adapted to engage the stationary structure of the fifth wheel when an attempt is made to operate the release handle. The engagement of the stationary structure of the fifth wheel by the fifth wheel catch prevents the release handle from being operated to unlock the fifth wheel from the supported load.

14 Claims, 9 Drawing Sheets

FIFTH WHEEL TRAILER LOCK

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a fifth wheel trailer lock for preventing a fifth wheel release handle from being operated to unlock a fifth wheel of a load hauler from a load supported by the fifth wheel.

Related Art

Any discussion of the related art throughout the specification should in no way be considered as an admission that such related art is widely known or forms part of common general knowledge in the field.

Fifth wheels are well known hitch assemblies for attaching loads, such as semi-trailers, to load haulers such as tractor units or trucks. The basic design of a fifth wheel allows a tractor unit or truck to haul a far heavier load than is possible with a simple ball or similar hitch mechanism. For one thing, a fifth wheel is designed to be attached to a tractor or truck rearward of its cab and forward of its rear axle so that the weight of the trailer or other load is distributed over the frame of the tractor or truck and is not concentrated on or rearward of the rear axle. For another, a fifth wheel is designed to be rigidly connected to the frame of the tractor or truck, rather than to a bumper or other cosmetic component, and to provide a connection point that is much more rugged and substantial than a simple ball or similar hitch mechanism.

A number of fifth wheel designs exist and are in common use, and a number of companies design, manufacture, and sell fifth wheels, including Jost International, Fontaine Fifth Wheel, Holland and others. Generally, however, the fifth wheels in substantial use today have certain common elements. Typically, they comprise a large, flat plate with a slotted opening facing rearward toward a trailer or other load to be attached. Often the slot is wider at the rearward end and narrower at the forward end to assist in guiding the trailer or other load into engagement with the fifth wheel. The plate is fixedly connected to the frame of a tractor or truck via a connection structure and is generally pivotable with respect to a horizontal plane between a downwardly tilted position for approaching and hitching the trailer or other load and a substantially horizontal position for supporting the weight of the hitched load. A set of spring-loaded jaws or clamps are mounted beneath the plate in line with and accessible through the slotted opening. Typically, the jaws or clamps are located at or near the forward narrower end of the slotted opening. Also typically, an externally accessible release handle is connected to the jaws or clamps by a connecting assembly beneath the flat plate. Depending on the particular design of the flat pate and connecting assembly, the handle may be pulled outward, pushed inward, slid forward, slid backward, or a combination of such movements to open or release the jaws or clamps. The trailer or other load to be hitched typically includes a downward facing plate and a substantial pin called a king pin designed to be engaged and retained by the fifth wheel.

In typical use, the release handle is operated to open the clamps or jaws and the flat plate is placed in the downwardly tilted position. The tractor or truck is then backed up to the trailer or other load so that the king pin engages the slotted opening. As the truck continues to back up the king pin rides up the slot until it engages the spring-loaded jaws or clamps. Upon engagement, the spring-loaded jaws or clamps automatically close on and lock around the king pin. The height of the trailer is then adjusted as necessary so that the plate on the trailer is supported substantially horizontally on the flat plate of the fifth wheel. To unhitch the trailer or other load, the release handle is operated to open the jaws or clamps and the front end of the trailer is raised slightly. Ground supports or landings are then put in place to support the trailer or other load, and the tractor pulls forward so that the king pin disengages from the jaws and slides outward along the slotted opening until free of the fifth wheel.

A potential problem with the fifth wheels in common use is that the release handle can be operated to release the jaws or clamps and thus unlock the fifth wheel from the king pin even when it is not intended for the trailer or other load to be separated from the tractor or truck. This can occur inadvertently, such as where someone has operated the release handle to release the jaws or clamps for a legitimate purpose and then forgotten to relock them. It can also occur intentionally, such as where a vandal has operated the release handle to release the jaws or clamps with the intent to cause damage. In either case, severe consequences can result if the unlocked condition is not discovered and a semi-trailer containing several tons of cargo separates from the fifth wheel while being hauled. The driver of the tractor unit from which the semi-trailer separates, as well as drivers of other vehicles could suffer severe injuries or even fatalities. Alternatively or in addition, severe damage to the tractor, the semi-trailer, the cargo, and other vehicles and property could result.

There is thus a need for a device to lock the release handle of a fifth wheel in place to prevent the intentional or unintentional unlocking of the fifth wheel and potential separation of a trailer or other load from the fifth wheel while underway. There is also a need for such a device that has one or more other favorable attributes, such as being inexpensive to produce, simple to use, easy to install and uninstall, compact, rugged, and resistant to wear and damage from the elements and other sources.

The example embodiments of a fifth wheel trailer lock disclosed herein are directed to addressing the foregoing needs and the foregoing and other problems of the prior art.

SUMMARY

Example embodiments are directed to a fifth wheel trailer lock adapted for use with a fifth wheel having a stationary structure, a flat plate for supporting a load, a locking mechanism for locking the fifth wheel with a supported load, and a release handle connected to the locking mechanism and operable to unlock the fifth wheel from the load. The fifth wheel trailer lock includes a handle mount adapted to be mounted on and releasably locked to the fifth wheel release handle. A lock extension extends outwardly from the handle mount into proximity with the stationary structure of the fifth wheel. A fifth wheel catch on or extending from the lock extension is configured to engage the stationary structure of the fifth wheel when an attempt is made to move the release handle. The engagement of the stationary structure by the fifth wheel catch prevents the release handle from being operated to unlock the fifth wheel from a supported load.

In some embodiments, the handle mount has a top plate and vertical side surfaces configured so that the handle mount is mounted to the release handle in a predetermined orientation. The lock extension and fifth wheel catch also are configured so that they are in proximity with and can engage the stationary structure of the fifth wheel only when the handle mount is mounted in the predetermined orientation.

The shapes and configurations of the handle mount, lock extension, and fifth wheel catch differ from embodiment to embodiment depending on the structural characteristics of the fifth wheel for which the fifth wheel lock is adapted to be used. These include the shape of the release handle, the connection between the release handle and the locking mechanism, and the particular shape and location of the fifth wheel stationary structure to be engaged.

There has thus been outlined, rather broadly, some of the embodiments of the fifth wheel trailer lock in order that the detailed description thereof may be better understood, and in order that the present contribution to the art may be better appreciated. There are additional embodiments of the fifth wheel trailer lock that will be described hereinafter and that will form the subject matter of the claims appended hereto. In this respect, before explaining at least one embodiment of the fifth wheel trailer lock in detail, it is to be understood that the fifth wheel trailer lock is not limited in its application to the details of construction or to the arrangements of the components set forth in the following description or illustrated in the drawings. The fifth wheel trailer lock is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Example fifth wheel trailer locks described herein are adapted for use with a fifth wheel load hitch having a stationary structure mounted to a load hauler, a flat plate connected with the stationary structure for supporting a load, a locking mechanism for locking the fifth wheel and load, and a release handle connected to the locking mechanism and operable to unlock the fifth wheel and load. Each of the example fifth wheel trailer locks generally comprises a handle mount, a lock extension, and a fifth wheel catch on the lock extension. The handle mount is adapted to be mounted to the fifth wheel release handle in a predetermined orientation and is configured to be releasably locked to the release handle. The lock extension extends outwardly from the handle mount into proximity with the stationary structure of the fifth wheel. The fifth wheel catch comprises a structural feature in or protruding outwardly from the lock extension that is adapted to immediately engage the stationary structure of the fifth wheel when an attempt is made to move the release handle. The fifth wheel lock thereby prevents the release handle from being operated to unlock the fifth wheel from a supported load.

The handle mount may have a top plate and vertical side surfaces configured to mount to the release handle in a predetermined orientation. In one embodiment, a vertical peg protruding downward from the underside of the top plate also facilitates mounting to and engagement of the release handle. The handle mount, lock extension, and fifth wheel catch can have various shapes and configurations depending on the shape of the fifth wheel release handle, the connection between the release handle and the locking mechanism of the fifth wheel, and the particular shape and location of the fifth wheel stationary structure to be engaged by the catch.

B. Handle Mount

Referring to FIGS. 1-4, a first example embodiment of a fifth wheel trailer lock 10 includes a handle mount 12. The handle mount 12 comprises a top plate 14 and a plurality of vertical partial side surfaces 16 spaced apart at predetermined positions around the peripheral edge of the top plate. The top plate also includes a lock opening 18. The lock opening 18 is formed near a peripheral edge of the top plate and is dimensioned to receive the free end of an open shackle of a lock (not shown), such as a conventional padlock.

The top plate 14 is shaped as an irregular polygon. The shape and dimensions of the top plate 14 are selected to generally correspond to the shape and dimensions of the fifth wheel release handle to which the handle mount 12 is intended to be mounted. Similarly, the vertical partial side surfaces 16 are dimensioned and placed around the peripheral edge of the top plate at spaced apart positions predetermined to facilitate mounting the handle mount to the fifth wheel release handle to which the handle mount is intended to be mounted. For example, the fifth wheel trailer lock 10 of FIGS. 1-4 is configured to be employed in connection with fifth wheels manufactured by SAF-Holland S.A., including for example various fifth wheels of the Holland FW35 series. Accordingly, the top plate 14 and vertical partial side surfaces 16 are shaped, dimensioned, and located to facilitate mounting the handle mount 12 to the release handles 71 of those fifth wheels and similarly configured fifth wheels, as best shown in FIGS. 12-15 and described in further detail below.

Figures 1, 2:
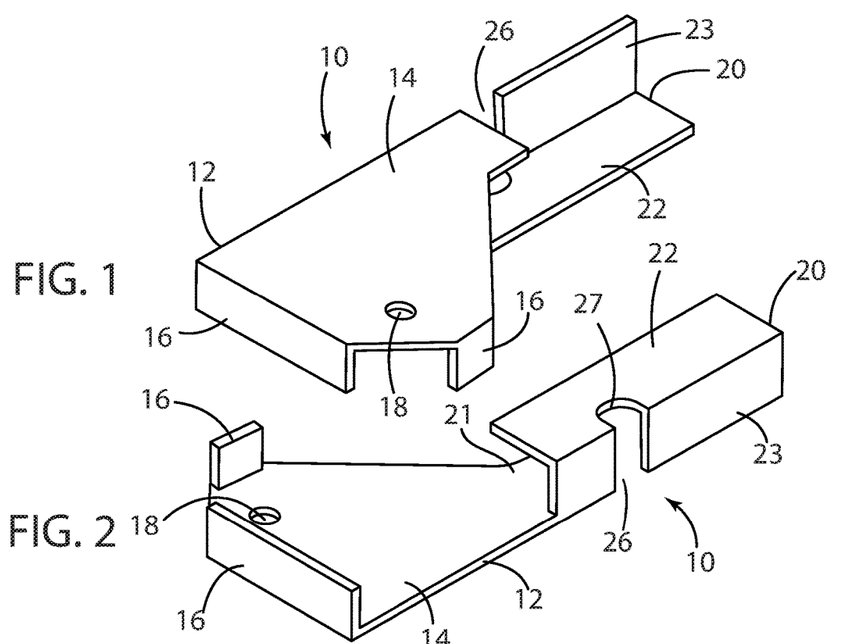
FIG. 1 is a top-side perspective view of a fifth wheel trailer lock in accordance with an example embodiment.
FIG. 2 is a bottom-side perspective view of a fifth wheel trailer lock in accordance with an example embodiment.
Figure 3:
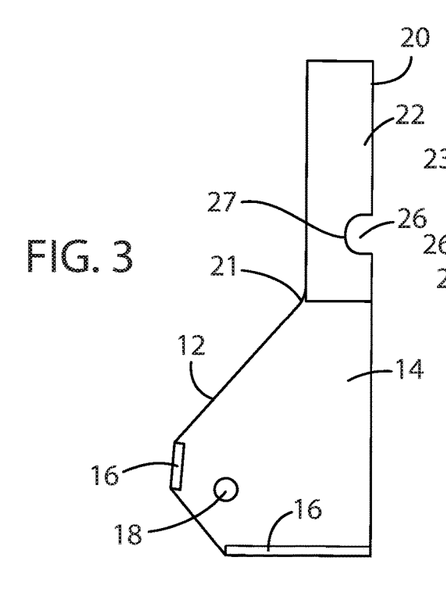
FIG. 3 is a bottom-side plan view of a fifth wheel trailer lock in accordance with an example embodiment.
Figure 4:
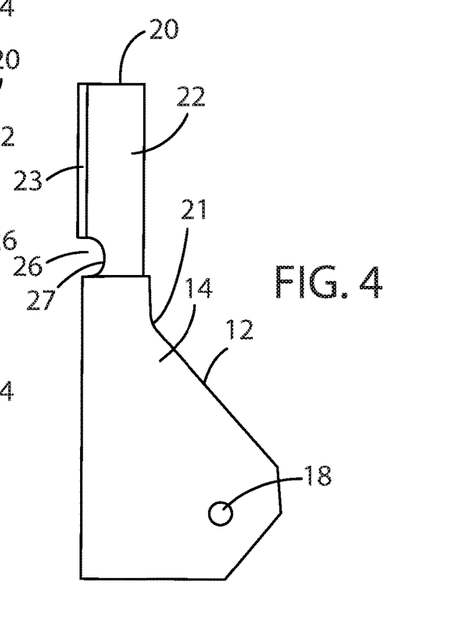
FIG. 4 is a top-side plan view of a fifth wheel trailer lock in accordance with an example embodiment.
Figure 5:
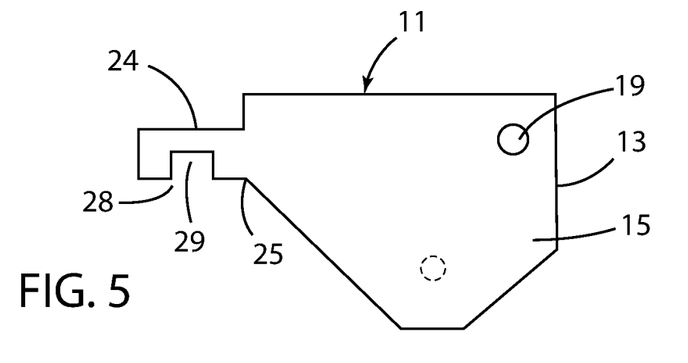
FIG. 5 is a top-side plan view of a fifth wheel trailer lock in accordance with a variation of the example embodiment of FIGS. 1-4.
Figure 6:
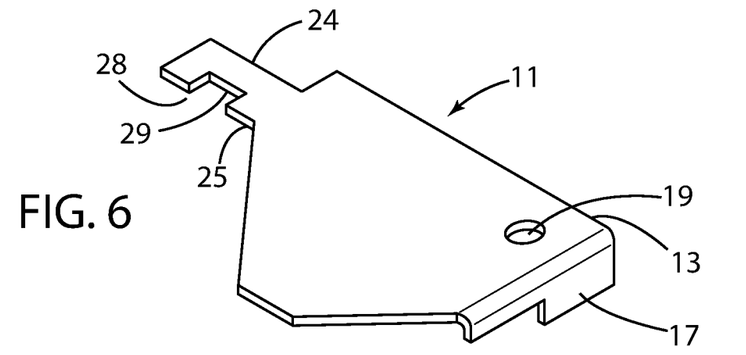
FIG. 6 is a top-side perspective view of a fifth wheel trailer lock in accordance with a variation of the example embodiment of FIGS. 1-4.
Figure 7:
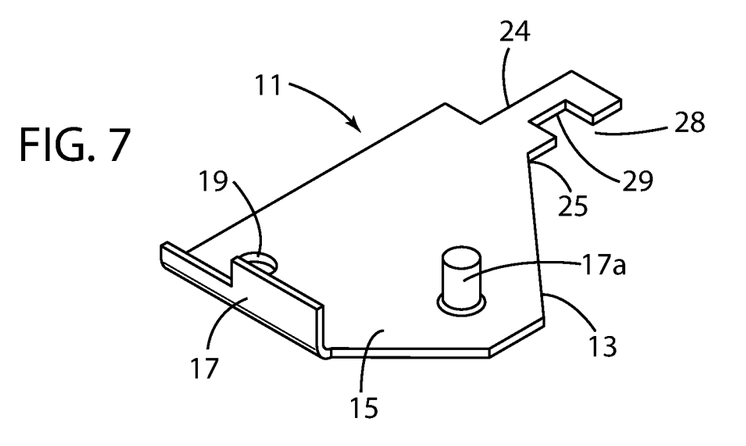
FIG. 7 is a top-side perspective view of a fifth wheel trailer lock in accordance with a variation of the example embodiment of FIGS. 1-4.

Referring to FIGS. 5-7, an example embodiment of a fifth wheel trailer lock comprising a variation of the example embodiment of FIGS. 1-4 is shown. The example embodiment of FIGS. 5-7 maintains a lower overall profile than the example embodiment of FIGS. 1-4 and therefore are particularly well suited for use with low profile fifth wheel designs. The fifth wheel trailer lock 11 includes a handle mount 13. The handle mount 13 comprises a top plate 15 and a plurality of vertical partial side surfaces 17 spaced apart at predetermined positions around the peripheral edge of the top plate. In this variation, an integral peg 17a extends substantially vertically downward from the underside of the top plate. The top plate also includes a lock opening 19. The lock opening 19 is formed near a peripheral edge of the top plate and is dimensioned to receive the free end of an open shackle of a lock (not shown), such as a conventional padlock.

Figure 16:
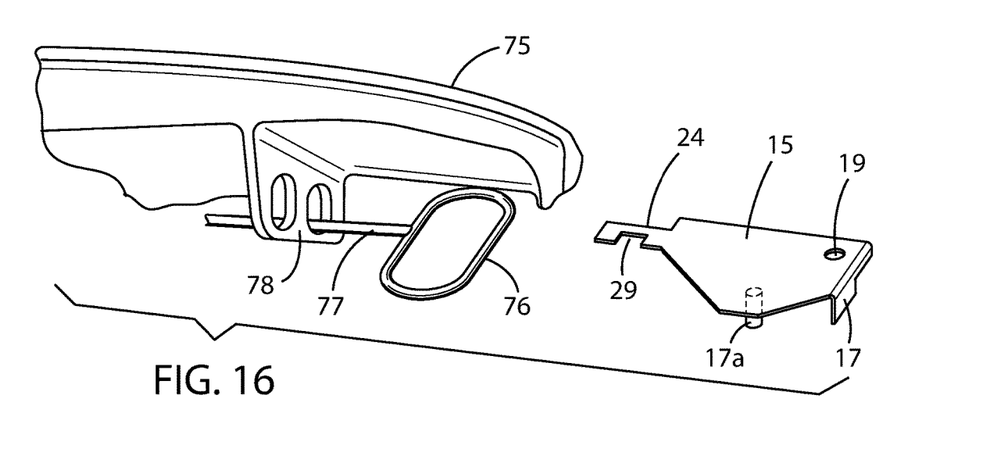
FIG. 16 is a perspective view of a fifth wheel trailer lock in accordance with the example embodiment of FIGS. 5-7 and a fifth wheel to be locked showing the orientation of the fifth wheel trailer lock relative to the fifth wheel.
Figure 17:
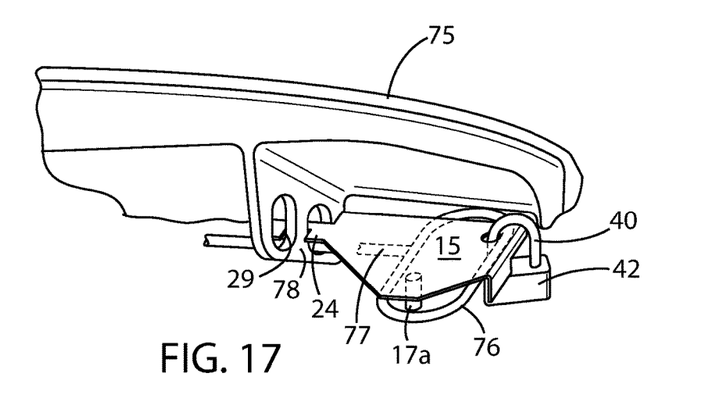
FIG. 17 is a perspective view of a fifth wheel trailer lock in accordance with the example embodiment of FIGS. 5-7 with the fifth wheel trailer lock mounted and locked to a fifth wheel.

The top plate 15 is shaped as an irregular polygon. The shape and dimensions of the top plate 15 are selected to generally correspond to the shape and dimensions of the fifth wheel release handle to which the handle mount 13 is intended to be mounted. Similarly, the vertical partial side surfaces 17 are dimensioned and placed around the peripheral edge of the top plate at spaced apart positions predetermined to facilitate mounting the handle mount to the fifth wheel release handle to which the handle mount is intended to be mounted. Also similarly, the vertical peg 17a is positioned on the underside of the top plate 15 in relation to the periphery of the top plate to cooperate with the vertical partial side surfaces 17 to facilitate mounting the handle mount 13 to the fifth wheel release handle and to maintain engagement between the handle mount and release handle once mounted. For example, the fifth wheel trailer lock 11 of FIGS. 5-7 is configured to be employed in connection with fifth wheels manufactured by SAF-Holland S.A., including for example various fifth wheels of the Holland FW35 series. Accordingly, the top plate 15, vertical partial side surfaces 17, and peg 17a are shaped, dimensioned, and located to facilitate mounting the handle mount 13 to the release handles 76 of those fifth wheels and similarly configured fifth wheels, as best shown in FIGS. 16-17 and described in further detail below.

Figure 8:
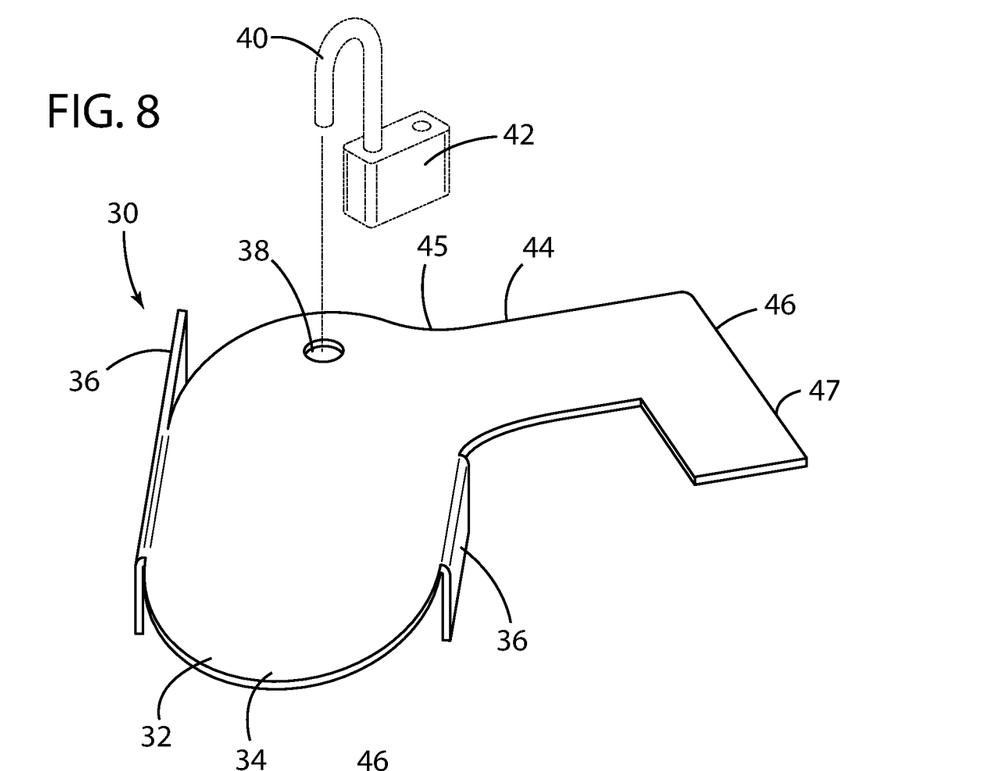
FIG. 8 is a top-side perspective view of a fifth wheel trailer lock in accordance with another example embodiment.
Figure 9:
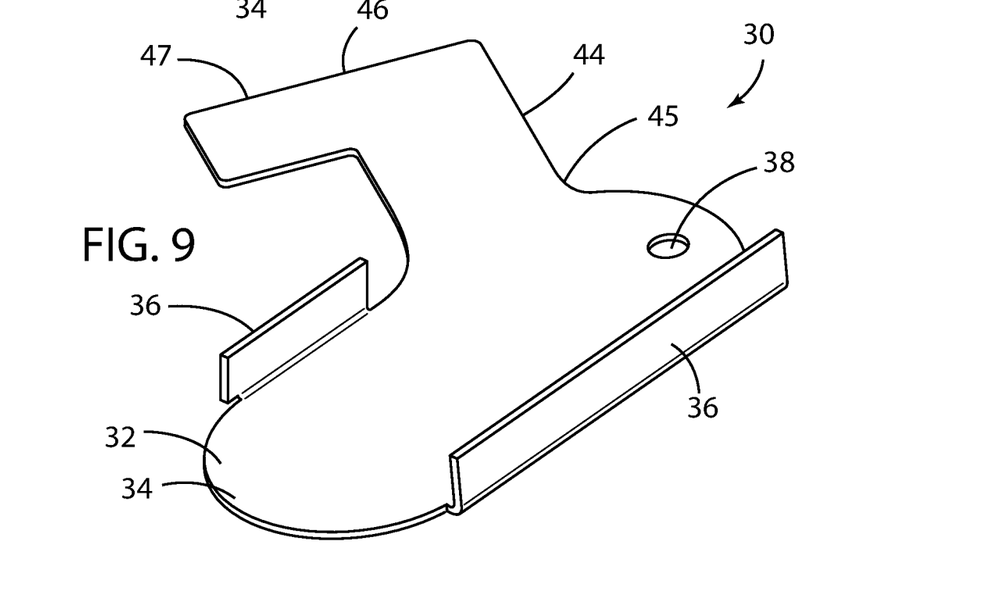
FIG. 9 is a bottom-side perspective view of a fifth wheel trailer lock in accordance with another example embodiment.

Referring to FIGS. 8-9, another example embodiment of a fifth wheel trailer lock 30 includes a handle mount 32 comprising a top plate 34 and a plurality of vertical partial side surfaces 36 spaced apart at predetermined positions around the peripheral edge of the top plate. The top plate includes a lock opening 38 formed near a peripheral edge of the top plate and dimensioned to receive the free end of an open shackle 40 of a lock 42, which is shown in dotted lines and is not part of the present invention. Lock 42 may be a conventional padlock for example.

Figure 18:
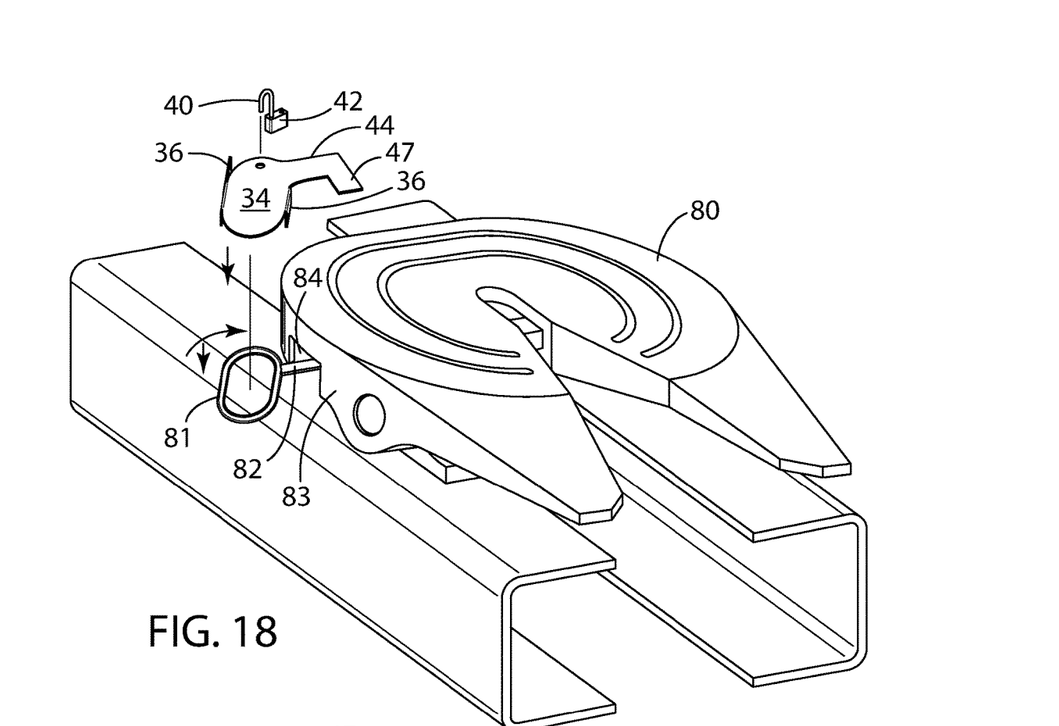
FIG. 18 is a perspective view of a fifth wheel trailer lock in accordance with the example embodiment of FIGS. 8-9 and a fifth wheel to be locked showing the orientation of the fifth wheel trailer lock relative to the fifth wheel.
Figure 19:
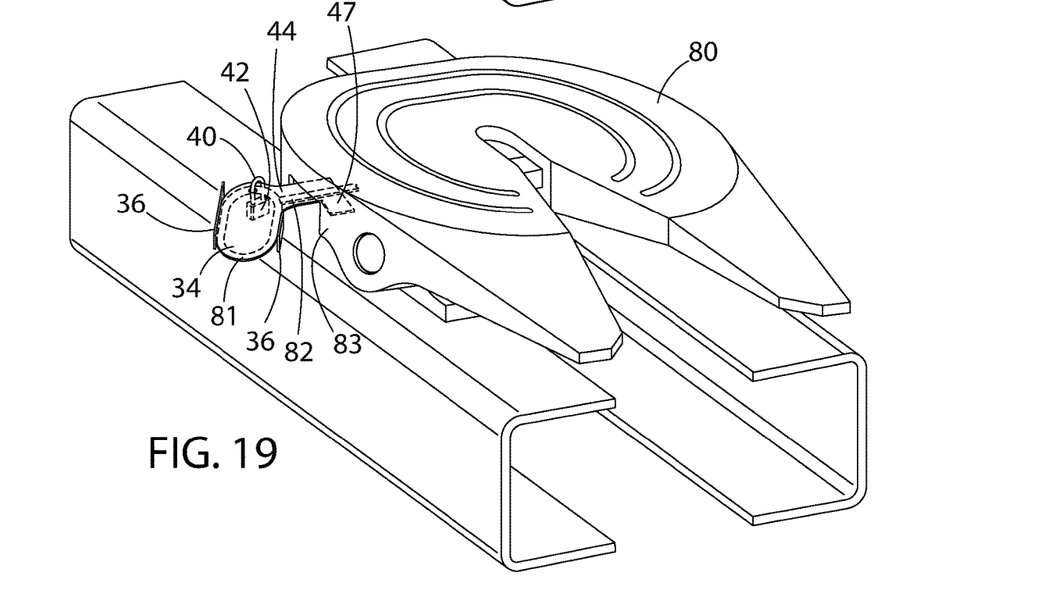
FIG. 19 is a perspective view of a fifth wheel trailer lock in accordance with the example embodiment of FIGS. 8-9 with the fifth wheel trailer lock mounted and locked to a fifth wheel.

The top plate 34 has a substantially elliptical shape. Similar to top plate 14 described above, the shape and dimensions of the top plate 34 are selected to generally correspond to the shape and dimensions of the fifth wheel release handle to which the handle mount 32 is intended to be mounted. Similarly, the vertical partial side surfaces 36 are dimensioned and located around the peripheral edge of the top plate at positions predetermined to facilitate properly mounting the handle mount to the fifth wheel release handle to which the handle mount is intended to be mounted. For example, the fifth wheel trailer lock 30 of FIGS. 8-9 is configured to be employed in connection with fifth wheels manufactured by Jost International, including for example various fifth wheels of the JSK 36 and JSK 37 series. Accordingly, the top plate 34 and vertical partial side surfaces 36 are shaped, dimensioned, and located to facilitate mounting the handle mount 32 to the release handles 81 of those fifth wheels and similarly configured fifth wheels, as best shown in FIGS. 18-19 and described in further detail below.

Figure 10:
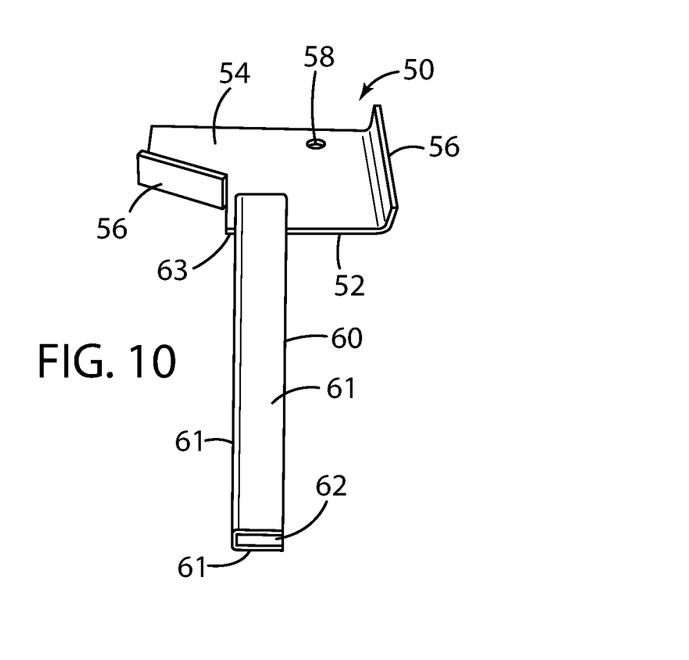
FIG. 10 is a bottom-side perspective view of a fifth wheel trailer lock in accordance with yet another example embodiment.
Figure 11:
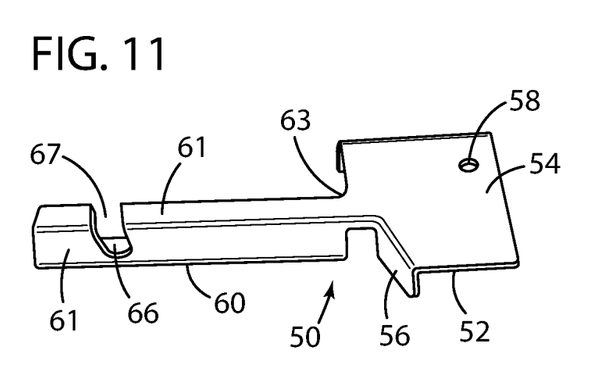
FIG. 11 is a top-side perspective view of a fifth wheel trailer lock in accordance with yet another example embodiment.
Figure 12:
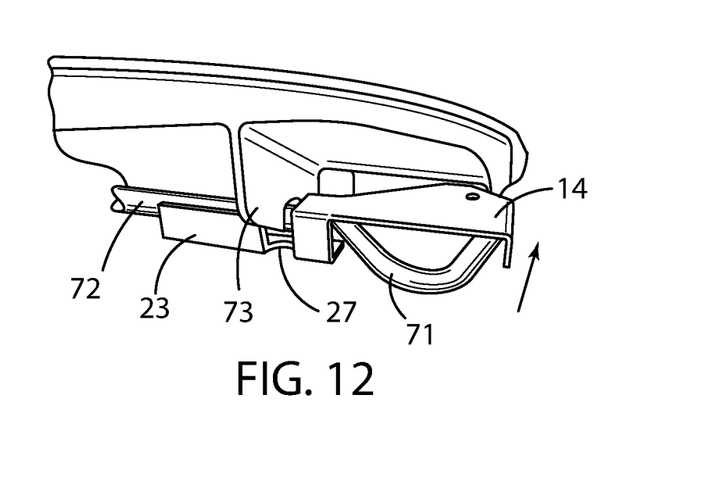
FIG. 12 is a perspective view of a fifth wheel trailer lock in accordance with the example embodiment of FIGS. 1-4 showing how the fifth wheel trailer lock is mounted to a fifth wheel release handle.
Figure 13:
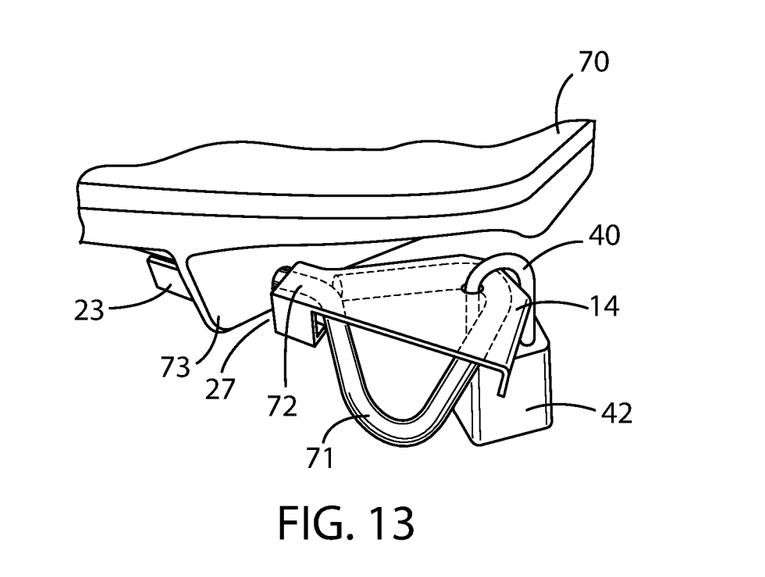
FIG. 13 is a perspective view of a fifth wheel trailer lock in accordance with the example embodiment of FIGS. 1-4 showing the fifth wheel trailer lock mounted and locked to a fifth wheel release handle.
Figure 14:
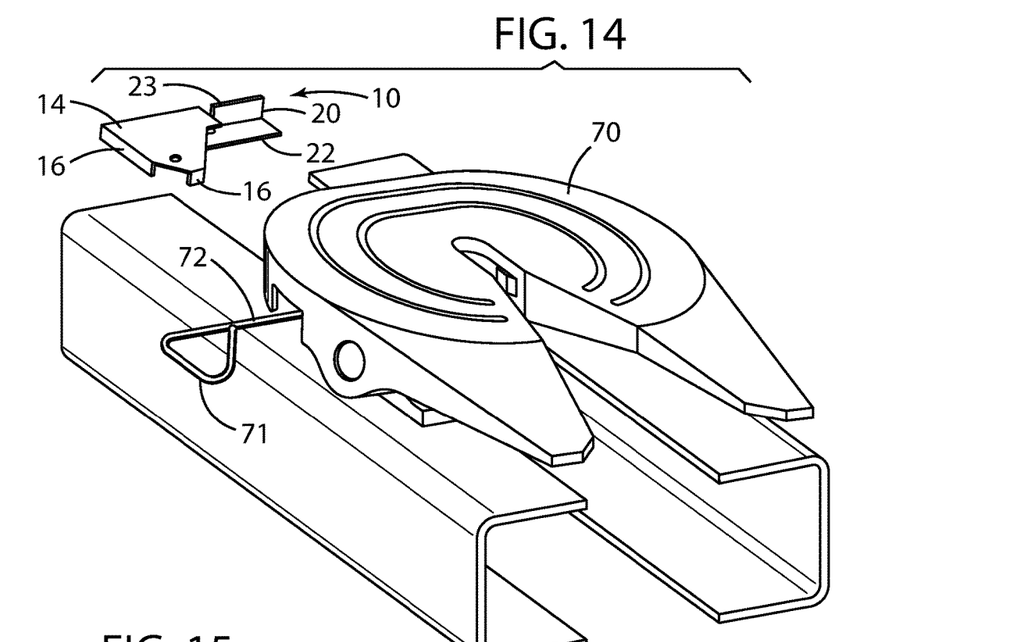
FIG. 14 is a perspective view of a fifth wheel trailer lock in accordance with the example embodiment of FIGS. 1-4 and a fifth wheel to be locked showing the orientation of the fifth wheel trailer lock relative to the fifth wheel.
Figure 15:
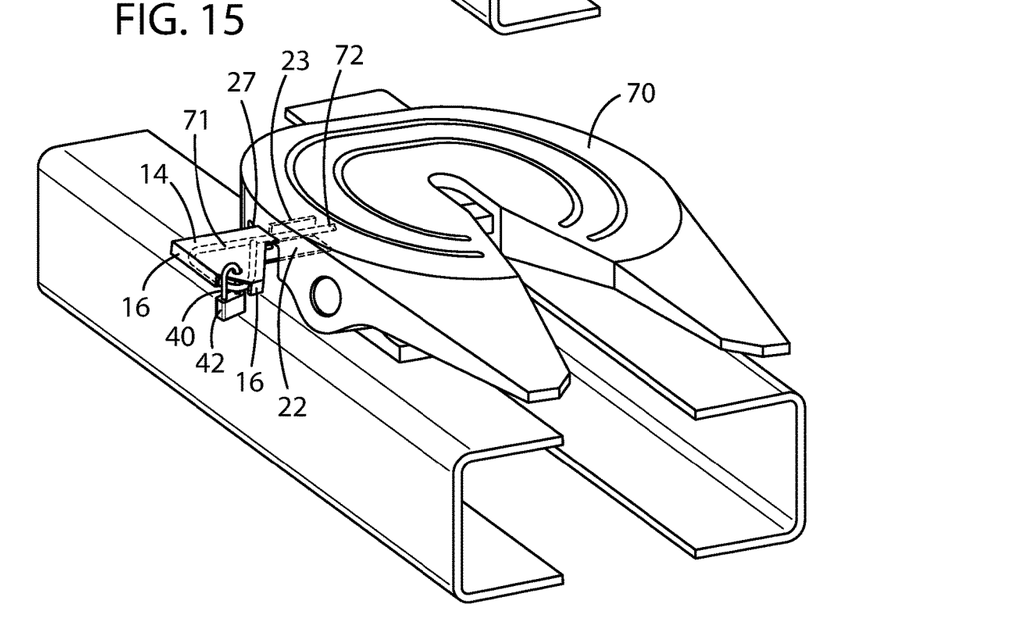
FIG. 15 is a perspective view of a fifth wheel trailer lock in accordance with the example embodiment of FIGS. 1-4 with the fifth wheel trailer lock mounted and locked to a fifth wheel.

Referring to FIGS. 10-11, yet another example embodiment of a fifth wheel trailer lock 50 includes a handle mount 52 comprising a top plate 54 and a plurality of vertical partial side surfaces 56 spaced apart at predetermined positions around the peripheral edge of the top plate. The top plate includes a lock opening 58 formed near a peripheral edge of the top plate and dimensioned to receive the free end of an open shackle of a lock (not shown), which may be a conventional padlock for example.

Figure 20:
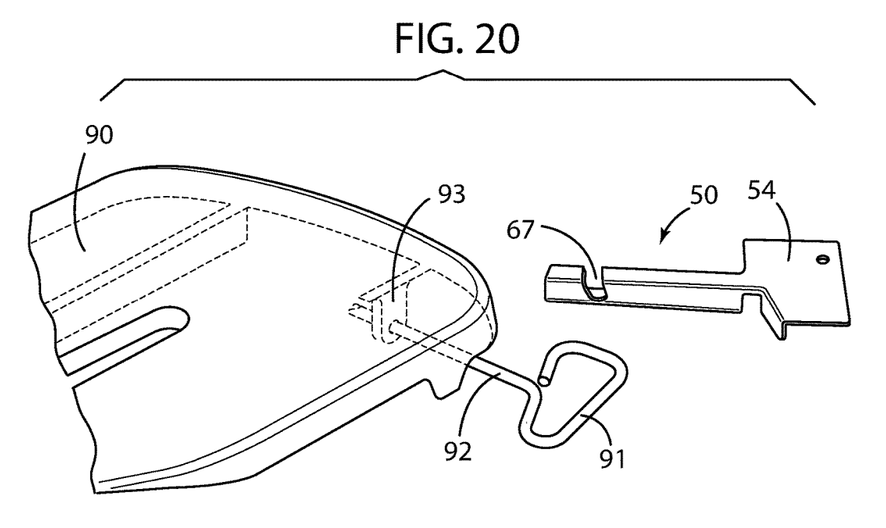
FIG. 20 is a perspective view of a fifth wheel trailer lock in accordance with the example embodiment of FIGS. 10-11 and a partial view of the release handle and flat plate of a fifth wheel to be locked showing the orientation of the fifth wheel trailer lock relative to the fifth wheel.
Figure 21:
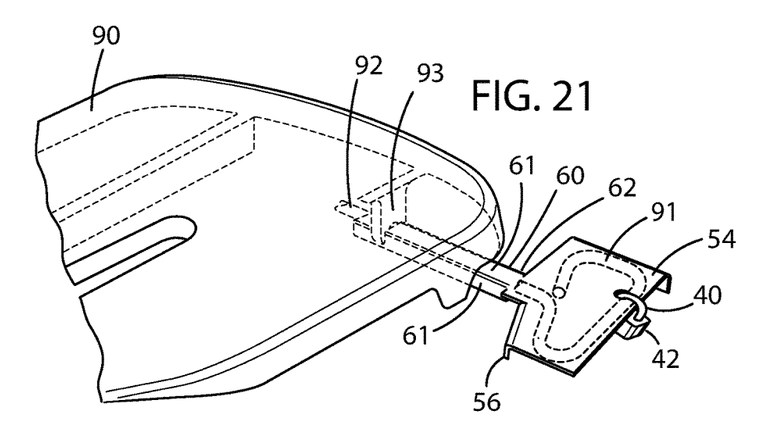
FIG. 21 is a perspective view of a fifth wheel trailer lock in accordance with the example embodiment of FIGS. 10-11 and a partial view of the release handle and flat plate of a fifth wheel with the fifth wheel trailer lock mounted and locked to the fifth wheel.

The top plate 54 has an irregular polygonal shape. Similar to top plates 14 and 34 described above, the shape and dimensions of the top plate 54 are selected to generally correspond to the shape and dimensions of the fifth wheel release handle to which the handle mount 52 is intended to be mounted. Similarly, the vertical partial side surfaces 56 are dimensioned and located around the peripheral edge of the top plate at positions predetermined to facilitate mounting the handle mount to the fifth wheel release handle to which it is intended to be mounted. For example, the fifth wheel trailer lock 50 of FIGS. 10-11 is configured to be employed in connection with fifth wheels manufactured by Fontaine Fifth Wheel, including for example various fifth wheels of the 6000 and 7000 series. Accordingly, the top plate 54 and vertical partial side surfaces 56 are shaped, dimensioned, and located to facilitate proper mounting of the handle mount 52 to the release handles 91 of those fifth wheels and similarly configured fifth wheels, as best shown in FIGS. 20-21 and described in further detail below.

C. Lock Extension

In each of the several example embodiments identified above, a lock extension 20, 24, 44, 60, extends outwardly from a respective handle mount 12, 13, 32, 52. In general, and as best illustrated in FIGS. 12-15, 16-17, 18-19, and 20-21, each lock extension 20, 24, 44, 60 is configured to extend outwardly from the respective handle mount 12, 13, 32, 52 at or near the location where a connecting rod or bar 72, 77, 82, 92 connects to a respective fifth wheel release handle 71, 76, 81, 91 to which the handle mount is designed to be mounted. Further, each lock extension 20, 24, 44, 60 is configured to extend outwardly from the respective handle mount 12, 13, 32, 52 in substantially the same direction as the connecting rod or bar 72, 77, 82, 92 extends from the respective release handle 71, 76, 81, 91 to connect the respective release handle to a respective fifth wheel flat plate 70, 75, 80, 90. Each lock extension 20, 24, 44, 60 is also shaped and configured to cooperate with the corresponding connecting rod or bar 72, 77, 82, 92 as a guide to facilitate proper mounting, orientation, and support of the fifth wheel lock 10, 11, 30, 50 relative to the structure of the fifth wheel to be locked.

Referring more specifically to the example embodiment shown in FIGS. 1-4, the lock extension 20 comprises a substantially L-shaped elongated bar, which extends outwardly from handle mount 12 starting at a location at or near a narrowed end 21 of the polygonal-shaped top plate 14. When the handle mount 12 is properly mounted to the fifth wheel release handle 71, the narrowed end 21 of the top plate 14 corresponds approximately to the location where the release handle 71 connects to a connecting rod 72, which in turn connects the release handle to the fifth wheel flat plate 70. The L-shaped bar is thus configured to extend outwardly from the handle mount 12 from that location in substantially the same direction as the connecting rod 72 extends from the release handle 71.

Further, the L-shaped bar is configured so that when the handle mount 12 is properly mounted to the release handle 71, a substantially horizontal surface 22 of the L-shaped bar extends longitudinally beneath the connecting rod 72 in a plane substantially parallel with the top plate 14, and a substantially vertical surface 23 of the L-shaped bar extends longitudinally alongside the connecting bar. The L-shaped bar comprising the lock extension is thus configured to cooperate with the connecting rod 72 to facilitate proper mounting, orientation, and support of the fifth wheel lock 10 relative to the structure of the fifth wheel to be locked.

Referring more specifically to the example embodiment shown in FIGS. 5-7, the lock extension 24 comprises a substantially flat elongated plate or bar, which extends outwardly from handle mount 13 starting at a location at or near a narrowed end 25 of the polygonal-shaped top plate 15. Because the lock extension 24 is configured to be substantially flat as compared to the L-shaped lock extension 20 of the embodiment of FIGS. 1-4, the fifth wheel lock 11 of FIGS. 5-7 has an overall lower profile, which renders it particularly well suited for use with low profile fifth wheel designs. When the handle mount 13 is properly mounted to the fifth wheel release handle 76, the narrowed end 25 of the top plate 15 corresponds approximately to the location where the release handle 76 connects to a connecting rod 77, which in turn connects the release handle to the fifth wheel flat plate 75. The flat elongated plate or bar comprising the lock extension 24 is thus configured to extend outwardly from the handle mount 13 from that location in substantially the same direction as the connecting rod 77 extends from the release handle 76.

Further, the substantially flat plate or bar comprising the lock extension 24 is configured so that when the handle mount 13 is properly mounted to the release handle 76, the flat plate or bar extends outwardly substantially co-planar with the top plate 15 and atop the connecting rod 77. The flat plate or bar comprising the lock extension 24 is thus configured to cooperate with the connecting rod 77 to facilitate proper mounting, orientation, and support of the fifth wheel lock 11 relative to the structure of the fifth wheel to be locked.

Referring more specifically to the additional example embodiment shown in FIGS. 8-9, the lock extension 44 comprises a substantially flat elongated plate or bar, which extends outwardly from handle mount 32 starting at a location 45 at or near an end of the substantially elliptical-shaped top plate 34. When the handle mount 32 is properly mounted to the fifth wheel release handle 81, the end 45 of the top plate 34 corresponds approximately to the location where the release handle 81 connects to a flat connecting bar 82, which in turn connects the release handle to the fifth wheel flat plate 80. The flat elongated plate or bar comprising the lock extension 44 is thus configured to extend outwardly from the handle mount 32 from that location in substantially the same direction as the connecting bar 82 extends from the release handle 81.

Further, the substantially flat plate or bar comprising the lock extension 44 is configured so that when the handle mount 32 is properly mounted to the release handle 81, the flat plate or bar extends outwardly substantially coplanar with the top plate 34 and atop the flat connecting bar 82. The flat plate or bar comprising the lock extension 44 is thus configured to cooperate with the flat connecting bar 82 to facilitate proper mounting, orientation, and support of the fifth wheel lock 30 relative to the structure of the fifth wheel to be locked.

Referring more specifically to the further example embodiment shown in FIGS. 10-11, the lock extension 60 comprises a substantially U-shaped elongated bar with three solid sides 61 and one open side 62. The bar extends outwardly from handle mount 52 starting at a location 63 on the periphery of the polygonal-shaped top plate 54. When the handle mount 52 is properly mounted to the fifth wheel release handle 91, the location 63 on the periphery of the top plate 54 corresponds approximately to the location where the release handle 91 connects to a connecting rod 92, which in turn connects the release handle to the fifth wheel flat plate. The U-shaped bar is thus configured to extend outwardly from the handle mount from that location in substantially the same direction as the connecting rod 92 extends from the release handle 91.

Further, the U-shaped bar is configured so that when the handle mount 52 is properly mounted to the release handle 91, the open side 62 of the U-shaped bar is the lateral side of the bar that faces and extends longitudinally along the connecting rod 92. In this orientation, the opposite lateral side, top side, and bottom side of the bar are preferably solid, except as described below with respect to the fifth wheel catch 66. As the handle mount is mounted to the release handle, the open side 62 slides over the connecting rod and the solid sides 61 surround and enclose the connecting rod. The U-shaped bar comprising the lock extension 60 is thus configured to cooperate with the connecting rod 92 to facilitate proper mounting, orientation, and support of the fifth wheel lock 50 relative to the structure of the fifth wheel to be locked.

D. Fifth Wheel Catch

In each of the several example embodiments identified above, a fifth wheel catch 26, 28, 46, 66 comprises part of a respective lock extension 20, 24, 44, 60 or protrudes outwardly from the respective lock extension. Generally, the fifth wheel catch is located and configured to engage a predetermined stationary portion of the fifth wheel structure when the fifth wheel lock is properly mounted and an attempt is made to operate the release handle. Typically, the release handle is operated by pulling the handle outward from the fifth wheel. The motion of the handle is communicated by the connecting rod to a release mechanism that releases the jaws or clamps that lock the king pin of the trailer or other load. By engaging a predetermined stationary structure of the fifth wheel as soon as an attempt is made to pull or otherwise move the release handle, the fifth wheel catch prevents the release handle from being further moved to unlock the fifth wheel from the load.

Referring more specifically to the example embodiment shown in FIGS. 1-4, the fifth wheel catch 26 comprises a notch 27 in the substantially vertical surface 23 of the L-shaped bar comprising the lock extension 20. The notch extends completely through the substantially vertical surface 23 from the top of the vertical surface to the intersection with the substantially horizontal surface 22. As best illustrated in FIGS. 12-15, the notch 27 is located at a point along the elongated L-shaped bar that is intersected by a stationary vertical support structure 73 that extends downward from the underside of the fifth wheel flat plate 70. Thus, when the fifth wheel lock 10 is properly installed with the handle mount 12 mounted to the release handle 71 in the proper orientation and the lock extension 20 aligned with the release handle connecting rod 72, the stationary vertical support structure 73 extends into the notch 27. In this position, any attempt to operate the release handle by pulling it outward from the fifth wheel results in the edge of the notch 27 and vertical surface 23 of the lock extension 20 immediately engaging the stationary support structure 73 thereby preventing any further movement of the release handle and connecting rod.

Referring more specifically to the additional example embodiment shown in FIGS. 5-7, the fifth wheel catch 28 comprises a notch 29 in one lateral side of the substantially horizontal elongated flat plate or bar comprising the lock extension 24. The notch extends laterally approximately half way through the width of the elongated flat bar. As best illustrated in FIGS. 16-17, the notch is located at a position along the length of the flat bar that is intersected by a stationary vertical support structure 78 that extends downward from the underside of the fifth wheel flat plate 75. Thus, when the fifth wheel lock 11 is properly installed with the handle mount 13 mounted to the release handle 76 in the proper orientation and the lock extension 24 aligned with the release handle connecting rod 77, the stationary vertical support structure 78 extends into the notch 29. In this position, any attempt to operate the release handle by pulling it outward from the fifth wheel results in the edges of the notch 29 immediately engaging the stationary support structure 78 thereby preventing any further movement of the release handle and connecting rod.

Referring more specifically to the additional example embodiment shown in FIGS. 8-9, the fifth wheel catch 46 comprises a flange or projection 47 that protrudes outwardly from the free end of the lock extension 44. Preferably, the flange or projection 47 comprises a substantially flat elongated plate section that is substantially co-planar with the lock extension 44 and extends at an angle of about 100-125 degrees relative to the longitudinal axis of the lock extension 44. As best illustrated in FIGS. 18-19, the fifth wheel flat plate 80 has a stationary vertical edge 83 that extends substantially downward at its periphery and that is adjacent to an opening 84. When the fifth wheel lock 30 is properly installed with the handle mount 32 mounted to the release handle 81 in the proper orientation and the lock extension 44 aligned with the release handle connecting bar 82, the lock extension 44 extends through the opening 84 and the fifth wheel catch 46 extends behind the stationary vertical edge 83 and in very close proximity to its backside beneath the flat plate 80. In this position, any attempt to operate the release handle by pulling it outward from the fifth wheel results in the flange or projection 47 immediately engaging the backside of the stationary vertical edge 83 thereby preventing any further movement of the release handle and connecting bar.

Referring more specifically to the example embodiment shown in FIGS. 10-11, the fifth wheel catch 66 comprises an angled notch 67 in the solid top side 61 and the solid lateral side 61 opposing the open side 62 of the U-shaped bar comprising the lock extension 60. The notch extends substantially completely through the solid top side and the solid lateral side down to where the solid lateral side intersects with the solid bottom side. As best illustrated in FIGS. 20-21, the notch 67 is located at a point along the elongated U-shaped bar that is intersected by a stationary vertical structure 93 that extends downward from the underside of the fifth wheel flat plate 90. The structure 93 comprises a flange or tab with an opening through which connecting rod extends beneath the flat plate 90. Thus, when the fifth wheel lock 50 is properly installed with the handle mount 52 mounted to the release handle 91 in the proper orientation and the lock extension 66 aligned with and enclosing the release handle connecting rod 92, the stationary vertical structure 93 extends into the notch 67. In this position, any attempt to operate the release handle by pulling it outward from the fifth wheel results in the edges of the notch 67 and the adjacent solid surfaces 61 immediately engaging the stationary vertical structure 93 thereby preventing any further movement of the release handle and connecting rod.

E. Construction and Material

Preferably, the foregoing example fifth wheel locks are constructed as a single piece structure without moving parts, making them inexpensive to construct and easy and simple to use. Also preferably, the fifth wheel locks are constructed of a material that is relatively inexpensive and that is rugged and resistant to wear and damage from the elements, vandalism, and other sources.

Various materials are known to have the desired attributes and may be used to construct the example fifth wheel locks. These include the materials commonly used to construct fifth wheel flat plates themselves. For example, various high quality metal materials such as high grade steel, ductile iron, and even forged aluminum may be used. Further, if a material subject to oxidation is used, such as an iron formulation, the fifth wheel locks may be protected by coating with a suitable epoxy paint or other similar material designed to limit or prevent direct exposure of the material to the elements.

Similarly, a variety of construction processes suitable to construct the example fifth wheel locks as single pieces are well known. Thus, the fifth wheel locks may be constructed by molding, casting, machining, forming, pressing, or a combination thereof. They also may be fabricated by constructing individual pieces and then permanently connecting the pieces, for example via welding. For example, the top plate and vertical side surfaces of the cover plate may be constructed separately and welded together. Similarly, the lock extension may be constructed separately and welded to the top plate and the fifth wheel catch may be constructed separately and welded to the lock extension.

The exact dimensions, shapes, and configurations of fifth wheel locks embodying the invention, as well as the dimensions, shapes and configurations of the components thereof, will vary depending on the particular fifth wheel on which a particular fifth wheel lock is adapted to be used. For example, the example fifth wheel lock illustrated in FIGS. 1-4 is adapted to be used on fifth wheels manufactured by SAF-Holland S.A., including for example various fifth wheels of the Holland FW35 series as described above. In this example fifth wheel lock, the irregular polygonal top plate 14 of the handle mount 12 is approximately 4" wide at its widest point and about 3" wide at the end opposite the end where the lock extension 20 connects. The narrowed end where the lock extension connects is about 1.5" wide. The vertical side surfaces 16 extend downwardly from the periphery of the top plate about 1.0". The L-shaped lock extension is about 1.5" wide and about 1.5" tall. The lock extension extends outwardly from the top plate about 4.5" and the notch comprising the fifth wheel catch 26 is located starting just outside the narrowed end of the top plate and extends for about 0.75" toward the distal end of the lock extension.

The example fifth wheel lock illustrated in FIGS. 5-7 is a variation on the example embodiment shown in FIGS. 1-4 and also is adapted to be used on fifth wheels manufactured by SAF-Holland S.A., including for example various fifth wheels of the Holland FW35 series as described above. In this variation, the irregular polygonal top plate 15 is approximately 5" wide at the side immediately adjacent the lock extension. The sides of the polygon narrow down to an opposite side about 0.75-1.25" wide. The width of the top plate between the longer side immediately adjacent the lock extension and the opposite side is about 4". The narrowed end of the top plate where the lock extension 24 connects is about 1.75-2.25" wide. The vertical side surfaces 17 extend downwardly from the periphery of the top plate about 1.0" and the peg 17*a* similarly extends downwardly from the underside of the top plate about 1.0". The peg 17*a* is located directly inward about 0.75-1.25" from the side opposite the side immediately adjacent to the lock extension. The flat bar comprising the lock extension 24 is about 0.75-1.25" wide and extends outwardly from the narrowed end of the top plate about 1.5-2.0." The notch 29 comprising the fifth wheel catch 28 is located on the lateral side of the flat bar opposite the side of the top plate 15 immediately adjacent to the lock extension 24. The edge of the notch closest to the top plate 15 is about 0.5-1.0" from the periphery of the top plate. The notch is about 0.5-0.75" wide along the length of the lock extension and extends about 0.5" laterally into the flat bar.

By comparison, the example fifth wheel lock illustrated in FIGS. 8-9, is adapted for use on fifth wheels manufactured by Jost International, including for example various fifth wheels of the JSK 36 and JSK 37 series as described above. In this example fifth wheel lock, the elliptical top plate 34 of the handle mount 32 is about 3.5" wide and 7.5-8.0" long, and the vertical side surfaces 36 extend downwardly from the periphery of the top plate about 1.0". The lock extension 44 extends outwardly from the top plate about 3.5" at an angle of between about 110-125 degrees with respect to the longitudinal axis of the elliptical top plate. The flange 47 comprising the fifth wheel catch 46 extends outwardly from the lock extension 44 about 1.25" at an angle of about 100-125 degrees relative to the longitudinal axis of the lock extension 44. The lock extension is about 2" wide at the point where the flange connects to it. The total dimension from the distal end of the lock extension to the opposite side of the elliptical top plate is approximately 7" on the side of the lock extension without the flange and about 8" on the side with the flange. The dimension measured directly across from the furthest extending point of the flange edge to the furthest extending peripheral edge of the elliptical top plate is about 8".

By further comparison, the example fifth wheel lock illustrated in FIGS. 10-11 is adapted for use on fifth wheels manufactured by Fontaine Fifth Wheel, including for example various fifth wheels of the 6000 and 7000 series as described above. In this example fifth wheel lock, one short side of the irregular polygonal top plate 54 of the handle mount 52 is about 3" wide. The other opposite short side is about 4" wide. The irregular polygonal top plate is about 7.0" in length between the two short sides. The vertical side surfaces 56 of the top plate extend downwardly from the periphery of the top plate about 1.0". The top plate is about 4" wide at the location where the lock extension 60 connects. The U-shaped lock extension is about 1.25" wide and 1.25" tall and extends outwardly from the long side of the top plate about 8" at approximately a 90 degree angle. The entire fifth wheel lock is about 12" in length from the side of the top plate opposite where the lock extension connects to the distal end of the lock extension. The notch 67 comprising the fifth wheel catch 66 is located about 6.5" from the long side of the top plate where the lock extension connects and is about 0.5-0.75" wide.

F. Operation of Preferred Embodiment

As best shown in FIGS. 12-15, 16-17, 18-19, and 20-21, in use an appropriate fifth wheel trailer lock adapted for use with the particular fifth wheel to be locked is selected. The handle mount of the selected fifth wheel trailer lock is then mounted to the fifth wheel release handle. The handle mount is mounted to the release handle by positioning the handle mount proximate to the release handle with the top plate and side surfaces of the handle mount oriented so that the handle mount can slide over and rest on the release handle. The handle mount is then slid over the release handle and lowered so that the top plate rests on the release handle with the outer periphery of the handle retained within the vertical side surfaces of the handle mount. In the embodiment of FIGS. 16-17, the handle mount is mounted to the release handle so that the peg 17*a* on the underside of the top plate 15 also extends downward inside the open loop of the release handle 76.

In this orientation, the lock extension extends under or through the fifth wheel flat plate, depending on the design and shape of the flat plate, and the fifth wheel catch is positioned in close proximity to or even in slight physical engagement with the stationary structure of the fifth wheel the catch is adapted to engage. For example, the slot-shaped catch 26 shown in FIGS. 1-4 is in close proximity to and essentially captures at least a portion of stationary vertical support structure 73 of the fifth wheel plate 70 that extends downward from the underside of the plate. Similarly, the notch-shaped catch 29 shown in FIGS. 5-7 is in close proximity to and essentially captures at least a portion of stationary vertical support structure 78 of the fifth wheel plate 75 that extends downward from the underside of the plate and supports the release handle connecting rod 77 as it extends under the plate. Similarly, the flange-shaped catch 46 shown in FIGS. 8-9 is in close proximity to the backside of a stationary vertical peripheral edge 83 of the fifth wheel plate 80 that extends substantially downward from the periphery of the plate. Also similarly, the notch-shaped catch 66 shown in FIGS. 10-11 is in close proximity to and essentially captures at least a portion of stationary vertical flange or tab 93 of the fifth wheel plate 90 that extends downward from the underside of the plate to support the connecting rod 92 of the fifth wheel release handle 91.

The handle mount is then locked to the release handle by inserting the free end of an open shackle 40 of a standard paddle lock 42 into the lock opening 18, 19, 38, 58 in the top plate 14, 15, 34, 54 of the handle mount 12, 13, 32, 52 and positioning the lock so that the shackle encloses a portion of the release handle 71, 76, 81, 91. The free end of the shackle is then inserted into the lock body and the locking mechanism is engaged, locking the handle mount to the release handle.

With the handle mount 12, 13, 32, 52 locked to the release handle 71, 76, 81, 91 and the fifth wheel catch 26, 28, 46, 66 positioned in proximity to the predetermined stationary portion of the fifth wheel structure 73, 78, 83, 93, the release handle cannot be operated to unlock the fifth wheel from a load supported on it. Any movement of the release handle is transferred from the handle mount to the fifth wheel catch through the lock extension. Any movement of the release handle thus causes the fifth wheel catch to immediately physically engage the predetermined stationary portion of the fifth wheel, e.g., a vertical support structure, vertical support flange, or vertical peripheral edge, which blocks further movement of the release handle and prevents the fifth wheel from being unlocked. The fifth wheel lock can be removed to permit the release handle to be operated to unlock the fifth wheel by simply reversing the procedure described above.

Unless otherwise defined, all technical and scientific terms used herein have the same meaning as commonly understood by one of ordinary skill in the art to which this invention belongs. Although methods and materials similar to or equivalent to those described herein can be used in the practice or testing of the fifth wheel trailer lock, suitable methods and materials are described above. All publications, patent applications, patents, and other references mentioned herein are incorporated by reference in their entirety to the extent allowed by applicable law and regulations. The fifth wheel trailer lock may be embodied in other specific forms without departing from the spirit or essential attributes thereof. In that regard, it is understood that what has been described above are several example embodiments that are specifically adapted for use with specific fifth wheels having specific structural configurations. Those skilled in the art will readily appreciate that the various shapes, dimensions, angles, orientations, configurations, and other physical attributes described with respect to the foregoing example embodiments may be altered for use with other fifth wheels or other load attachment mechanisms having other structural configurations without departing from the spirit and essence of the invention. It is therefore desired that the present embodiments be considered in all respects as illustrative and not restrictive. Any headings utilized within the description are for convenience only and have no legal or limiting effect.

What is claimed is:

1. A lock for use with a fifth wheel having a stationary structure, a flat plate for supporting a load, and a release handle operable to unlock the flat plate from the load, comprising:
    a mount adapted to be releasably locked to the release handle;
    an extension extending outwardly from the mount into proximity with the stationary structure of the fifth wheel; and
    a catch on the extension adapted to engage the stationary structure of the fifth wheel when the release handle is operated;
    whereby the lock is adapted to prevent operation of the release handle to unlock the flat plate from the load;
    wherein the mount has a top plate and a plurality of side surfaces adapted to mount to the release handle in a predetermined orientation;
    wherein the extension and catch are configured to be in proximity with the stationary structure to be engaged by the catch only when the mount is mounted to the release handle in the predetermined orientation;
    wherein the mount has an opening adapted to receive at least a portion of a lock to releasably lock the mount and the release handle in the predetermined orientation;
    wherein the mount, extension, and catch comprise a unitary structure;
    wherein the mount has a shape substantially similar to the shape of the release handle;
    wherein the extension extends under the flat plate and wherein the catch is adapted to engage the stationary structure under the flat plate.

2. The lock of claim 1, wherein the extension comprises an elongated substantially flat bar and wherein the catch comprises a notch formed in a lateral side of the bar.

3. The lock of claim 1, wherein the extension comprises an elongated substantially flat bar and wherein the catch comprises a flange protruding outwardly from the bar.

4. The lock of claim 1, wherein the extension comprises an elongated substantially U-shaped bar and the catch comprises a slot formed in the bar.

5. A fifth wheel hitch for releasably attaching a load to a load hauler, comprising:
    a stationary structure adapted to be mounted to the load hauler;
    a plate connected to the stationary structure for supporting the load;
    a locking mechanism for releasably locking the fifth wheel and load;
    a release handle connected to the locking mechanism and operable to unlock the fifth wheel from the load;
    a mount adapted to be releasably locked to the release handle;
    an extension extending outwardly from the mount into proximity with the stationary structure; and
    a catch on the extension adapted to engage the stationary structure when the release handle is operated;

whereby the lock is adapted to prevent operation of the release handle to unlock the fifth wheel from the load.

6. The lock of claim 5, wherein the mount has a top plate and a plurality of side surfaces adapted to mount to the release handle in a predetermined orientation.

7. The lock of claim 6, wherein the extension and the catch are configured to be in proximity with the stationary structure to be engaged by the catch only when the mount is mounted to the release handle in the predetermined orientation.

8. The lock of claim 7, wherein the mount has an opening adapted to receive at least a portion of a lock to releasably lock the mount and the release handle in the predetermined orientation.

9. The lock of claim 8, wherein the mount, extension, and catch comprise a unitary structure.

10. The lock of claim 9, wherein the mount has a shape substantially similar to the shape of the release handle.

11. The lock of claim 10, wherein the extension extends under the flat plate and wherein the catch is adapted to engage the stationary structure under the flat plate.

12. The lock of claim 11, wherein the extension comprises an elongated substantially flat bar and wherein the catch comprises a notch formed in a lateral side of the bar.

13. The lock of claim 11, wherein the extension comprises an elongated substantially flat bar and wherein the catch comprises a flange protruding outwardly from the bar.

14. The lock of claim 11, wherein the extension comprises an elongated substantially U-shaped bar and the catch comprises a slot formed in the bar.

* * * * *